United States Patent [19]
Cawlfield et al.

[11] Patent Number: 5,510,097
[45] Date of Patent: Apr. 23, 1996

[54] HYDROXYLAMMONIUM NITRATE FREE OF AMMONIUM NITRATE

[75] Inventors: David W. Cawlfield; Ronald L. Dotson, both of Cleveland; Harry J. Loftis, Riceville; Sanders H. Moore; Robert T. Brooker, both of Cleveland, all of Tenn.; Jay S. Stirrat, Louisville, Ky.

[73] Assignee: Olin Corporation, Cheshire, Conn.

[21] Appl. No.: 245,928

[22] Filed: May 19, 1994

[51] Int. Cl.⁶ .................................................. C01B 21/20
[52] U.S. Cl. ........................... 423/387; 203/49; 203/92
[58] Field of Search ....................... 423/387; 203/49, 203/92

[56] References Cited

U.S. PATENT DOCUMENTS

| | | | |
|---|---|---|---|
| 4,260,462 | 4/1981 | Didycz et al. | 203/92 |
| 4,956,168 | 9/1990 | Wagaman | 423/387 |
| 5,213,784 | 5/1993 | Cawlfield | 423/387 |
| 5,266,290 | 11/1993 | Levinthal et al. | 423/387 |

*Primary Examiner*—Wayne Langel
*Attorney, Agent, or Firm*—Dale L. Carlson

[57] ABSTRACT

The present invention relates to a multi-step process for producing HAN that is free of ammonium nitrate. The process comprises the steps of: (a) stripping ammonia from an ammonia-containing, aqueous hydroxylamine solution having a hydroxylamine concentration of at least 10% by weight based upon the weight of the hydroxylamine solution, by contacting the ammonia-containing hydroxylamine solution with a stripping agent selected from the group consisting of inert gases and steam to provide an ammonia-free, aqueous hydroxylamine solution, and (b) reacting the ammonia-free, aqueous hydroxylamine solution with aqueous nitric acid having an acid concentration of at least about 0.1%, preferably at least about 20%, based upon the weight of the aqueous nitric acid, to produce ammonium nitrate-free HAN. In another process embodiment of the invention, the above-described ammonia stripping step is not required, and the hydroxylamine concentration is at least about 0.5%, based upon the weight of the reaction mixture employed. Also disclosed is the ammonium nitrate-free HAN product produced by the process of this invention.

14 Claims, No Drawings

HYDROXYLAMMONIUM NITRATE FREE OF AMMONIUM NITRATE

FIELD OF THE INVENTION

This invention relates generally to the production of hydroxylammonium nitrate ("HAN"), and, more specifically, to a process for preparing concentrated HAN that is free of ammonium nitrate.

BACKGROUND OF THE INVENTION

HAN is an important chemical compound that is employed in the purification of plutonium metal, as one component of a liquid propellant, and as a reducing agent in photographic applications. In some of these applications, a highly pure, concentrated form of aqueous HAN is required.

Concentrated, aqueous HAN solutions are typically prepared by reacting aqueous hydroxyl amine with aqueous nitric acid, followed by a HAN concentration step. Illustrative chemical processes for producing HAN are disclosed in U.S. Pat. Nos. 5,213,784 and 5,266,290.

Propellant applications typically require the use of concentrated HAN having a concentration of at least about 80% by weight based upon the weight of the aqueous HAN solution, and also require that the HAN solution not contain ammonium nitrate in a concentration of above its solubility limit of about 5% based upon the weight of the aqueous HAN. Heretofore, however, the presence of significant amounts of ammonium nitrate has been difficult to avoid, due to the presence of ammonia in commercially available hydroxyl amine. During production of HAN, the ammonia typically present in the hydroxyl amine reactant tends to react with nitric acid to form ammonium nitrate. The ammonium nitrate is extremely difficult, if not impossible, to separate from the HAN solution.

As mentioned above, hydroxylamine currently available from commercial sources contains ammonia. Further, additional ammonia tends to form in the hydroxylamine during storage prior to use. Prior art methodology for purifying hydroxylamine has been found by the present inventors to be ineffective in removing ammonia from the hydroxylamine. By way of illustration, when hydroxylamine is purified by distillation at an elevated temperature under reduced pressure, as disclosed for example in U.S. Pat. No. 5,266,290, at column 5, lines 54–60, the present inventors have found that the ammonia evaporates and recondenses in the condensate. Furthermore, as heat is applied to effect evaporation of the hydroxylamine, thermal decomposition reactions tend to occur with respect to the hydroxylamine, thereby producing additional amounts of ammonia, which is also collected in the condensate together with the distilled hydroxylamine. Accordingly, distillation cannot be used to remove ammonia from hydroxylamine. When used to produce HAN, the ammonia present in the ammonia-containing hydroxylamine reactant forms ammonium nitrate, which, as noted above, is difficult or impossible to separate from the HAN product.

In view of the above, processes for producing ammonium nitrate-free HAN would be highly desired by the propellants manufacturing community and by the military. The present invention provides one such process.

SUMMARY OF THE INVENTION

In one aspect, the present invention relates to a process for producing ammonium nitrate-free HAN comprising the steps of:

(a) stripping ammonia from an ammonia-containing, aqueous hydroxylamine solution having a hydroxylamine concentration of at least about 10% by weight based upon the weight of the hydroxylamine solution, by contacting the ammonia-containing hydroxylamine solution with a stripping agent selected from the group consisting of inert gases and steam to provide an ammonia-free, aqueous hydroxylamine solution, and (b) reacting the ammonia-free, aqueous hydroxylamine solution with aqueous nitric acid having an acid concentration of between about 20% and about 70%, based upon the weight of the aqueous nitric acid, to produce an aqueous HAN product that is essentially free of ammonium nitrate.

In another aspect, the present invention relates to a process for producing ammonium nitrate-free, metal ion-free HAN comprising the steps of:

(a) removing metal ions from a metal ion-containing, ammonia-containing aqueous hydroxylamine solution, having a hydroxylamine concentration of at least 10% by weight based upon the weight of the hydroxylamine solution, by distilling the metal ion-containing, ammonia-containing hydroxylamine solution, or by treating the metal ion-containing, ammonia-containing hydroxylamine solution with a chelating ion exchange resin, to provide a metal ion-free, ammonia-containing aqueous hydroxylamine solution, (b) stripping ammonia from said metal ion-free, ammonia-containing hydroxylamine solution by contacting the metal ion-free, ammonia-containing hydroxylamine solution with a stripping agent selected from the group consisting of inert gases, steam, and combinations thereof, to provide a metal ion-free, ammonia-free, aqueous hydroxylamine solution, and (c) reacting the metal ion-free, ammonia-free, aqueous hydroxylamine solution with metal ion-free, aqueous nitric acid having an acid concentration of at least 20%, based upon the weight of the aqueous nitric acid, to produce an aqueous HAN product that is essentially free of ammonium nitrate.

In still another aspect, the present invention relates to a continuous process for producing HAN by the steps of:

(a) removing metal ions from a metal ion-containing, ammonia-containing aqueous hydroxylamine solution, having a hydroxylamine concentration of at least about 10% by weight based upon the weight of the hydroxylamine solution, by distilling the metal ion-containing, ammonia-containing hydroxylamine solution, or by treating the metal ion-containing, ammonia-containing hydroxylamine solution with a chelating ion exchange resin, to provide a metal ion-free, ammonia-containing aqueous hydroxylamine solution, (b) stripping ammonia from said metal ion-free, ammonia-containing hydroxylamine solution by contacting the metal ion-free, ammonia-containing hydroxylamine solution with a stripping agent selected from the group consisting of inert gases and steam to provide a metal ion-free, ammonia-free, aqueous hydroxylamine solution, (c) reacting the metal ion-free, ammonia-free, aqueous hydroxylamine solution with an essentially equimolar amount of a metal ion-free, aqueous nitric acid having an acid concentration of between about 20% and about 70%, based upon the weight of the aqueous nitric acid, to produce ammonium nitrate-free HAN containing excess hydroxylamine or excess nitric acid, and (d) contacting said excess hydroxylamine with additional nitric acid or contacting said excess nitric acid with additional hydroxylamine in order to produce excess nitric acid-free and excess hydroxylamine-free HAN that is essentially free of ammonium nitrate, and (e) repeating steps (a) through (d) in a continuous fashion.

In yet another aspect, the present invention relates to a process for producing HAN which comprises reacting a reaction mixture comprising an ammonia-free or ammonia-containing, aqueous hydroxylamine solution and aqueous nitric acid, said aqueous hydroxylamine solution having an ammonia concentration of less than 10% (preferably less than 5%, more preferably at most between about 0.1% and about 2%), based upon the molar amount of hydroxylamine in said aqueous hydroxylamine solution, said reaction mixture having a hydroxylamine concentration of at least about 0.05% (advantageously between 0.05% and 8%, more advantageously between 0.05% and 5%), based upon the weight of the reaction mixture, said aqueous nitric acid having an acid concentration of between about 0.1% and about 70% (advantageously between 0.1% and 16%), based upon the weight of the reaction mixture, to produce an aqueous HAN product solution containing less than the solubility limit of ammonium nitrate of 0° C., preferably less than 10% of ammonium nitrate, based upon the weight of the HAN product solution. The reaction mixture suitably additionally comprises HAN (e.g., in a batch reactor or a re-circulating stream) in an amount of between 0% and about 40%, based upon the weight of the reaction mixture. The hydroxylamine solution in the reaction mixture is suitably replenished by adding thereto a replenishing hydroxylamine solution having a concentration of at least about 10% of hydroxylamine, based upon the weight of said replenishing hydroxylamine solution. The aqueous nitric acid in the reaction mixture is suitably replenished by adding thereto replenishing aqueous nitric acid having an acid concentration of between about 15% and about 70% (advantageously between 16% and 19%), based upon the weight of said replenishing aqueous nitric acid.

In another embodiment, the process of the present invention employs a first process step wherein said reaction mixture contains a molar excess of said nitric acid relative to said hydroxylamine, or a molar excess of said hydroxylamine relative to said nitric acid, to produce HAN containing excess hydroxylamine or excess nitric acid, and additional process step of contacting said excess hydroxylamine with additional nitric acid or contacting said excess nitric acid with additional hydroxylamine in order to produce excess nitric acid-free and excess hydroxylamine-free HAN that is essentially free of ammonium nitrate, and wherein said first process step and said additional process step are repeated at least once to provide a continuous process.

In another aspect, the present invention relates to the HAN product produced by the above-described processes.

These and other aspects will become apparent upon reading the following detailed description of the invention.

DETAILED DESCRIPTION OF THE INVENTION

It has now been surprisingly discovered in accordance with the present invention that ammonium nitrate-free HAN is suitably produced by using the multi-step processes of the present invention. In contrast, prior art processes for producing HAN tend to provide a product that contains unacceptable amounts of ammonium nitrate.

The processes of the present invention avoid this problem associated with producing low ammonium nitrate solutions of hydroxylamine by using a multi-step process that entails first separating the dissolved ammonia from aqueous hydroxylamine by stripping with an inert gas, such as nitrogen or argon, or by stripping with steam under reduced pressure. Owing to the high volatility of ammonia, and the low volatility of hydroxylamine in aqueous solutions, this stripping process is effective in removing essentially all of the dissolved ammonia from the hydroxylamine without significant losses of valuable hydroxylamine. By separating the ammonia from the hydroxylamine reactant before subsequent reaction with aqueous nitric acid to form HAN, HAN solutions that are essentially ammonium nitrate-free to the desired purity level are produced. Concentration of the HAN solutions can be performed by evaporation under reduced pressure.

The aqueous nitric acid useful as a starting material in the process of the present invention is suitably aqueous nitric acid having an acid concentration of between about 0.1% and about 70% (advantageously between about 20% and about 70%, more advantageously between about 30% and about 50%) by weight based upon the weight of the aqueous nitric acid employed. In another embodiment, the aqueous nitric acid is suitably present in the reaction mixture in an amount of between about 0.1% and about 70%, based upon the weight of the reaction mixture. The aqueous nitric acid is suitably replenished in said reaction mixture by adding thereto replenishing aqueous nitric acid having an acid concentration of between about 15% and about 70% (e.g., between 15% and 19%), based upon the weight of the replenishing aqueous nitric acid.

The hydroxylamine useful as a starting material in the process of the present invention is suitably an aqueous hydroxylamine solution preferably containing at least about 10% (advantageously at least about 30%, more advantageously at least about 40%) by weight of hydroxylamine based upon the weight of the solution. The starting hydroxylamine solution useful in the process of the present invention is suitably obtainable from commercial sources or can be prepared by well-known techniques. Commercially available hydroxylamine, such as that is commercially available through an importer (Howard Hall International Inc.) is acceptable for use as a starting material. Known production processes for producing hydroxylamine include the treatment of hydroxylammonium salts with an ion exchange resin, neutralization with alkali metal hydroxide followed by distillation, or neutralization with alkali metal hydroxide in the presence of an alcohol. The hydroxylamine is suitably present in the reaction mixture in an amount of at least about 0.05% (e.g., between 0.05% and 8%, or between 0.05% and 5%), based upon the weight of the reaction mixture. The hydroxylamine in the reaction mixture is suitably replenished by adding to the reaction mixture a replenishing hydroxylamine solution having a concentration of at least about 5% (e.g., between 5% and 9%) of hydroxylamine, based upon the weight of said replenishing hydroxylamine solution.

The hydroxylamine useful in the process of the present invention can be alcohol-free or alcohol-containing. The present inventors have found that the presence of alcohol in the starting hydroxylamine solution does not interfere with the process of this invention. Even though alcohol cannot be easily separated from the hydroxylamine, it can be completely removed during concentration of the HAN solution under vacuum, provided that the alcohol has a molecular weight of less than or equal to about 200. This finding is clearly contrary to the teaching of U.S. Pat. No. 5,266,290, which requires the use of alcohol-free hydroxylamine in the HAN production process disclosed in the '290 patent. Therefore, the applicability of the process of the present invention extends to the use of both alcohol-free and alcohol-containing hydroxylamine as starting materials.

In accordance with the process of the present invention, it is important to minimize or reduce the presence of metals and metal ions, particularly transition metals such as copper and iron, in the aqueous hydroxylamine solution in order to prolong the stability and shelf life of the hydroxylamine reactant. The presence of certain metals and ions thereof (such as iron and lead) is known to be undesirable in hydroxylamine solutions, as disclosed for example in U.S. Pat. No. 5,266,290, at column 5, lines 43–53 thereof, as well as copper ions and/or particulate contaminants. It has now been found that the presence of metals and ions thereof is also undesirable in HAN solutions, since the metals and metal ions tend to catalyze HAN degradation into byproducts. It is therefore preferred to remove, or avoid the presence of, transition metal elements and metal ions dissolved or suspended in any HAN product solution. Unfortunately, however, since HAN solutions having equimolar quantities of hydroxylammonium and nitrate irons are naturally acidic, generally having a pH of between about 2 and about 2.5, dissolved metal ions are difficult to remove. Therefore, the process of the present invention is needed in order to avoid the presence of these metal ions in the HAN product solution ab initio.

The preferred method for removing metals and metal ions from the nitric acid is by distillation of the starting nitric acid. Metals and metal ions, including transition metal ions, can be removed from the hydroxylamine solution either by distillation, or more preferably by treatment of the hydroxylamine solution with a chelating ion exchange resin. The hydroxylamine solution is distilled under low pressure conditions, i.e. reduced pressure, preferably vacuum conditions at a temperature of not greater than about 65° C., advantageously 40°–60° C. and particularly 40°–50° C. As contemplated herein, low pressure refers to less than about 50 mm Hg, preferably 10–20 mm Hg. Chelating ion exchange resins typically remove essentially all metal ions, except alkali metal ions, from the hydroxylamine solution. In accordance with the processes of the present invention, removal of "essentially all" of the metal ions from the nitric acid and from the hydroxylamine, to provide nitric acid and hydroxylamine that is "essentially free" of metal and metal ions, prevents or avoids decomposition reactions that otherwise can occur during mixing of the acid and the base. As used herein the term "essentially free" is intended to denote the presence of less than 1 ppm of any metal or metal ion in the referenced nitric acid, hydroxylamine or HAN solution.

Chelating ion exchange resins which are suitable for use in the present invention include any and all chelating ion exchange resins capable of removing metals and metal ions from hydroxylamine, while being nonreactive with the hydroxylamine component. Examples of suitable chelating ion exchange resins include iminodicarboxylic acid-derivatized poly(chloromethyl styrene), 2,5-dihydroxyterephthalaldehydediamine Schiff polyacrylates and polyhydroxamic acid derivatized from polyacrylate and hydroxylamine, beta-diketonic polymers, poly-phosphoric acids, polyamines, and the like.

One preferred chelating ion exchange resin is DIANION CR-10 resin produced by Mitsubishi Kasei of Tokyo, Japan. This chelating ion exchange resin is a cross-linked styrene-divinyl benzene copolymer resin having amino-functional chelating groups in the polymer. Another useful chelating ion exchange resin is DIANION CR-20 resin, also produced by Mitsubishi Kasei of Tokyo, Japan. This chelating ion exchange resin is another cross-linked styrene-divinyl benzene copolymer resin having polyamine functional chelating groups in the copolymer and having an average 1.2 micron particle diameter. Another chelating ion exchange resin is DOWEX A-1 resin, commercially available from Dow Chemical Company of Midland, Mich. This is an iminodicarboxylic acid type of resin.

Preferred physical forms of the chelating ion exchange resin which can be used are those which can be packed into compartments and include beads, rods, fibers or a cast form with internal flow channels. Resin bead forms of the resin are preferred and most readily available.

Regeneration Of chelating ion exchange resins to their acid form and thorough rinsing with deionized water are recommended steps prior to use of these resins in treating hydroxylamine solutions.

Any form of mixing of the hydroxylamine with nitric acid of any concentration will tend to produce some miniscule quantity of hydroxylamine nitrate. However, the HAN yield from the process of the present invention is maximized when the excess acidity in the mixing zone is minimized, for example when the excess acidity in the mixing zone is less than about 50%, or more preferably less than about 10% by weight of the free nitric acid present. The temperature in the mixing zone is preferably controlled to less than about 60° C. It is readily apparent that these preferred conditions can be obtained by a wide variety of mixing methods, for example: adding hydroxylamine and nitric acid simultaneously to a stirred or recirculated solution of HAN; cooling either the hydroxylamine, the nitric acid, or both, or a recirculated solution of HAN; by batchwise addition of the nitric acid to the hydroxylamine (advantageously while cooling one or both reactants to a reduced temperature of between about 0° C. and about 20° C.); or by batchwise addition of the hydroxylamine to the nitric acid. Because the rate of decomposition of HAN in the presence of concentrated nitric acid is also a function of the residence time, rapid mixing or stirring of the reactant mixture is preferred in order to reduce the likelihood of decomposition of the HAN and thereby improve the overall yield of HAN. The decomposition that occurs during mixing can produce ammonium nitrate.

In another aspect of the present invention, a continuous process is provided for the production of a HAN product characterized by a very low excess acid or excess free base is another desired result of this invention. The present inventors have found that a continuous process for producing an equimolar solution of HAN with accurate control of excess acidity and alkalinity is provided by combining hydroxylamine with nitric acid in at least two mixing zones. In a first mixing zone, the bulk of the hydroxylamine and the nitric acid are added to produce a solution that contains only a small excess of either hydroxylamine or nitric acid. In the second mixing zone additional nitric acid or hydroxylamine (as required) is added to the mixture to balance the mixture in order to provide an aqueous HAN product solution that is essentially free of excess nitric acid and excess hydroxylamine. Feedback control over the mixing ratio is preferably by measuring the pH of the mixture. For optimum control, the amount of both acid and hydroxylamine added to the first mixing zone is preferably at least about 90% of the total required for an equimolar mixture. Also, the volume of the second mixing zone is preferably larger than the volume of the first mixing zone.

Because a high purity product is desired, any undesired contaminants in the HAN are preferably removed from, or avoided in, the feedstock nitric acid and hydroxylamine to be reacted. For example, potential impurities include, but are not limited to, sulfate or other sulfur and oxysulfur compounds, halides, nitrite, nitric oxide, alkali metal ions, alkali earth metal ions, transition metal ions, insoluble solids, organics, phosphates, and compounds of aluminum and silicon.

During decomposition of HAN and hydroxylamine due to the presence of undesirable impurities, significant quantities of nitrous oxide and lesser amounts of other nitrogen oxides and nitrogen gas are formed, in addition to ammonium nitrate. Of these, nitrous oxide has the highest aqueous solubility and can accumulate to a measurable degree. It is not currently known that the presence of nitrous oxide has any negative effect on the stability or performance of either HAN solutions or propellants made from HAN solutions. However, these dissolved gaseous impurities are easily removed during concentration of the HAN by vacuum evaporation.

Liquid gun propellants comprising energetically effective amounts of hydroxylammonium nitrate and triethanolammonium nitrate in water can be obtained by further concentrating the hydroxylammonium nitrate solutions obtained in accordance with the present invention followed by addition of triethanolamine nitrate according to available known procedures.

The following examples are intended to illustrate, but in no way limit the scope of, the present invention.

EXAMPLE 1

To an insulated Dewar flask, 115.11 grams of acid HAN was added and temperature noted to be 23.9° C. To this stirred flask was added 5.52 ml of HA from Howard Hall, which had been exposed to $N_2$ bubbling for one hour to rid of $NH_3$. The temperature rose to 31.9° C., as the pH reached 2.22, which is a target point for insuring removal of ammonia in the form of free amine from the hydroxylamine. The final solution contained 0.008% free amine, 31.5% HAN and 3% ammonium nitrate, and thus demonstrated that the HA could not be added to an acidified solution without extensive decomposition of the HAN to ammonium nitrate, AN, thus demonstrating a less preferred embodiment of the present invention.

TABLE 1

Data on the pH and Temperature Values Obtained During Hydroxylamine Addition to Nitric Acid

| ml HA | pH | Temp |
|---|---|---|
| 0 | .14 | 23.9 |
| 2.15 | .17 | 27.4 |

TABLE 1-continued

Data on the pH and Temperature Values Obtained During Hydroxylamine Addition to Nitric Acid

| ml HA | pH | Temp |
|---|---|---|
| 4.20 | .37 | 30.5 |
| 5.50 | 1.85 | 32.1 |
| 5.51 | 2.08 | 32.0 |
| 5.52 | 2.22 | 31.9 |

It is concluded based upon the results provided by this example that, when utilizing the order of addition specified in this example to provide ammonium nitrate-free HAN in accordance with the present invention, the nitric acid must be added to the hydroxylamine (also referred to herein as "HA") under conditions where the HA is very cold and mixing is adequate to prevent localized decomposition. The initial pH of the HA is 10.48, and the final target pH of the acidified HAN solution is 1.95–2.1.

EXAMPLES 2–11

600 grams of 25% HA from Howard Hall were placed in a cooled reactor, nitrogen was bubbled through for one hour to remove ammonia, then acid added by pumping from as breaker on an analytical balance 35% electronic grade nitric acid from Olin Electronic Materials Division slowly with rapid mixing in the reactor, keeping the temperature between 0.5 to 9° C. In all cases the metals levels were well within the desired specification, and gave the following compositional amounts:

TABLE 2

| | Weight Percents of HAN, $HNO_3$ and AN in Product | | | | | | | | | |
|---|---|---|---|---|---|---|---|---|---|---|
| Ex. # | #2 | #3 | #4 | #5 | #6 | #7 | #8 | #9 | #10 | #11 |
| % HAN | 31.2 | 30.8 | 31 | 30.9 | 31.1 | 31.2 | 30.8 | 31 | 30.9 | 31.1 |
| % $HNO_3$ | .010 | .008 | .013 | 0.14 | .020 | .010 | .008 | .013 | .014 | .020 |
| % AN | 0.02 | 0.12 | 0.11 | 0.10 | 0.12 | 0.02 | 0.12 | 0.11 | 0.10 | 0.12 |

While the invention has been described above with references to specific embodiments thereof, it is apparent that many changes, modifications and variations in the materials, arrangements of parts and steps can be made without departing from the inventive concept disclosed herein. For example, in employing the of the present invention, Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A process for producing ammonium nitrate-free HAN comprising the steps of:

(a) stripping ammonia from an ammonia-containing, aqueous hydroxylamine solution having a hydroxylamine concentration of at least about 10% by weight based upon the weight of the hydroxylamine solution, by contacting the ammonia-containing hydroxylamine solution with a stripping agent selected from the group consisting of inert gases and steam to provide an ammonia-free, aqueous hydroxylamine solution, and (b) reacting the ammonia-free, aqueous hydroxylamine solution with aqueous nitric acid having an acid concentration of between about 20% and about 70%, based upon the weight of the aqueous nitric acid, to produce an aqueous HAN product that is essentially free of ammonium nitrate.

2. The process of claim 1 wherein said inert gas is selected from the group consisting of nitrogen, argon, and combinations thereof.

3. The process of claim 1 wherein said stripping agent is steam and wherein said steam is employed at a reduced pressure being subatmospheric pressure.

4. A process for producing ammonium nitrate-free, metal ion-free HAN comprising the steps of:
   (a) removing metal ions from a metal ion-containing, ammonia-containing aqueous hydroxylamine solution, having a hydroxylamine concentration of at least about 10% by weight based upon the weight of the hydroxylamine solution, by distilling the metal ion-containing, ammonia-containing hydroxylamine solution, or by treating the metal ion-containing, ammonia-containing hydroxylamine solution with a chelating ion exchange resin, to provide a metal ion-free, ammonia-containing aqueous hydroxylamine solution,
   (b) stripping ammonia from said metal ion-free, ammonia-containing hydroxylamine solution by contacting the metal ion-free, ammonia-containing hydroxylamine solution with a stripping agent selected from the group consisting of inert gases and steam to provide a metal ion-free, ammonia-free, aqueous hydroxylamine solution, and
   (c) reacting the metal ion-free, ammonia-free, aqueous hydroxylamine solution with metal ion-free, aqueous nitric acid having an acid concentration of at least about 20%, based upon the weight of the aqueous nitric acid, to produce an aqueous HAN product that is essentially free of ammonium nitrate.

5. The process of claim 4 wherein said inert gas is selected from the group consisting of nitrogen, argon, and combinations thereof.

6. The process of claim 4 wherein said stripping agent is steam and wherein said steam is employed at a reduced pressure being subatmospheric pressure.

7. The process of claim 4 wherein said chelating ion exchange resin is selected from the group consisting of cross-linked styrene-divinyl benzene copolymer resin having amino-functional chelating groups in the copolymer.

8. The process of claim 4 which additionally comprises a HAN concentration step to provide a concentrated aqueous product having a HAN concentration of at least about 80% by weight and an ammonium nitrate concentration of less than 4% by weight, based upon the weight of the concentrated aqueous product.

9. A continuous process for producing HAN by the steps of:
   (a) removing essentially all metal ions from a metal ion-containing, ammonia-containing aqueous hydroxylamine solution, having a hydroxylamine concentration of at least about 10% by weight based upon the weight of the hydroxylamine solution, by distilling the metal ion-containing, ammonia-containing hydroxylamine solution, or by treating the metal ion-containing, ammonia-containing hydroxylamine solution with a chelating ion exchange resin, to provide a metal ion-free, ammonia-containing aqueous hydroxylamine solution,
   (b) stripping ammonia from said metal ion-free, ammonia-containing hydroxylamine solution by contacting the metal ion-free, ammonia-containing hydroxylamine solution with a stripping agent selected from the group consisting of inert gases and steam to provide a metal ion-free, ammonia-free, aqueous hydroxylamine solution,
   (c) reacting the metal ion-free, ammonia-free, aqueous hydroxylamine solution with an essentially equimolar amount of a metal ion-free, aqueous nitric acid having an acid concentration of between about 20% and about 70%, based upon the weight of the aqueous nitric acid, to produce ammonium nitrate-free HAN containing excess hydroxylamine or excess nitric acid, and
   (d) contacting said excess hydroxylamine with additional nitric acid or contacting said excess nitric acid with additional hydroxylamine in order to produce excess nitric acid-free and excess hydroxylamine-free HAN that is essentially free of ammonium nitrate, and
   (e) repeating steps (a) through (d) in a continuous fashion.

10. The process of claim 9 wherein said inert gas is selected from the group consisting of nitrogen, argon, and combinations thereof.

11. The process of claim 9 wherein said stripping agent is steam and wherein said steam is employed at a reduced pressure being subatmospheric pressure.

12. The process of claim 9 wherein said chelating ion exchange resin is selected from the group consisting of cross-linked styrene-divinyl benzene copolymer resin having amino-functional chelating groups in the copolymer.

13. The process of claim 9 wherein said chelating ion exchange resin is in a form selected from the group consisting of beads, rods, fibers, cast forms with internal flow channels, and combinations thereof.

14. The process of claim 10 wherein the metal ion-free, aqueous nitric acid is produced by distilling metal ion-containing aqueous nitric acid.

* * * * *